(12) United States Patent
Fagrell et al.

(10) Patent No.: US 7,781,557 B2
(45) Date of Patent: *Aug. 24, 2010

(54) STABILIZATION OF CROSS-LINKED SILANE GROUP CONTAINING POLYMERS

(75) Inventors: Ola Fagrell, Stenungsund (SE); Mattias Gothe, Göteborg (SE)

(73) Assignee: Borealis Technology Oy, Porvoo (FI)

( * ) Notice: Subject to any disclaimer, the term of this patent is extended or adjusted under 35 U.S.C. 154(b) by 390 days.

This patent is subject to a terminal disclaimer.

(21) Appl. No.: 11/823,039

(22) Filed: Jun. 26, 2007

(65) Prior Publication Data

US 2008/0015327 A1    Jan. 17, 2008

Related U.S. Application Data

(60) Division of application No. 10/688,252, filed on Oct. 17, 2003, now abandoned, which is a continuation-in-part of application No. PCT/EP02/04773, filed on Apr. 30, 2002.

(30) Foreign Application Priority Data

May 2, 2001 (EP) ................... 01110688

(51) Int. Cl.
C08K 5/13 (2006.01)
C08K 5/372 (2006.01)
C08K 5/42 (2006.01)

(52) U.S. Cl. ......................... 528/23; 524/158
(58) Field of Classification Search .................. 528/23; 524/158
See application file for complete search history.

(56) References Cited

U.S. PATENT DOCUMENTS

| 3,646,155 | A |   | 2/1972  | Scott |
| 4,117,195 | A |   | 9/1978  | Swarbrick et al. |
| 5,350,812 | A |   | 9/1994  | Sultan et al. |
| 5,661,219 | A | * | 8/1997  | Nakane et al. ............. 525/166 |
| 5,814,695 | A |   | 9/1998  | Fitzgerald et al. |
| 5,891,979 | A |   | 4/1999  | Dammert et al. |
| 5,922,403 | A | * | 7/1999  | Tecle ......................... 427/212 |
| 6,005,055 | A |   | 12/1999 | Dammert et al. |

FOREIGN PATENT DOCUMENTS

| WO | WO 92/21721 | 12/1992 |
| WO | WO 95/17463 | 6/1995 |

\* cited by examiner

Primary Examiner—Kelechi C Egwim
(74) Attorney, Agent, or Firm—Fay Sharpe LLP

(57) ABSTRACT

The present invention relates to a composition for cross-linking and stabilization of a polymer containing hydrolysable silane groups comprising a sulfonic acid as a silanol condensation catalyst characterized in that it comprises a stabilizer which is neutral or acidic, does not contain ester groups and is a compound according to formula (I):

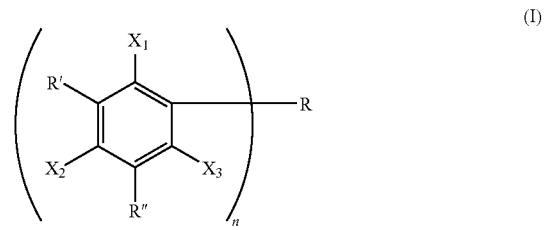

wherein
R is an unsubstituted or substituted aliphatic or aromatic hydrocarbyl radical which may comprise heteroatoms,
R' is a hydrocarbyl radical,
R" is a hydrocarbyl radical and R' and/or R" being a bulky radical,
$X_1$, $X_2$ or $X_3$ is the same or different H or OH, whereby at least $X_1$, $X_2$ or $X_3$ is OH,
and n is 1 to 4;
or a compound according to formula (II):

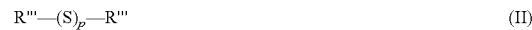

wherein
R''' is an aliphatic hydrocarbyl radical and
p is 1 to 6;
or a mixture of any of such compounds, to a stabilized polymer comprising the above stabilizers and to a process for cross-linking and stabilization of silane group containing polymers in the presence of the above mentioned stabilizers.

19 Claims, No Drawings

STABILIZATION OF CROSS-LINKED SILANE GROUP CONTAINING POLYMERS

This application is a divisional application of U.S. Ser. No. 10/688,252, filed Oct. 17, 2003 now abandoned, which is a continuation-in-part of PCT/EP02/04773 filed Apr. 30, 2002, which claims priority of European Application No. 01 110 688.7 filed on May 2, 2001.

The present invention relates to a composition for cross-linking and stabilization of polymers containing hydrolysable silane groups which comprises a sulphonic acid as a silanol condensation catalyst. Further, the present invention relates to a stabilized polymer containing cross-linked silane groups wherein the cross-linking has been performed by the use of a sulphonic acid as a silanol condensation catalyst and to a process for cross-linking and stabilization of silane group containing polymers by the use of a sulphonic acid as a silanol condensation catalyst.

It is known to cross-link polymers by means of additives as this improves the properties of the polymer such as mechanical strength and chemical heat resistance. Cross-linking may be performed by condensation of silanol groups contained in the polymer which can be obtained by hydrolysation of silane groups. For cross-linking of such polymers, a silanol condensation catalyst must be used. Conventional catalysts are for example tin-organic compounds such as dibutyl tin dilaurate (DBTDL). It is further known that the cross-linking process advantageously is carried out in the presence of acidic silanol condensation catalysts. In contrast to the conventional tin-organic catalysts the acidic catalysts allow cross-linking to quickly take place already at room temperature. Such acidic silanol condensation catalysts are disclosed for example in WO 95/17463.

To ensure long-term stability of polymers it is known to add stabilizers to the polymer in order to prolong its lifetime. In particular, stabilizers are added to the polymer which protect it from degradation caused by thermal oxidation, UV-radiation, processing and by penetration of metal ions, such as copper ions.

For the stabilization of cross-linked polymers it is clear that the stabilizer must be added to the polymer before the cross-linking step is performed. In the case of silane group containing polymers where the cross-linking is effected by the condensation of silane groups the stabilizer usually is added to the polymer together with the silanol condensation catalyst, preferably in the form of a master batch.

The stabilizer must be therefore compatible with the silanol condensation catalyst, i.e. must not degrade on contact with the catalyst as this may lead to exudation, i.e. migration of the stabilizer or fragments thereof to the surface of the composition or the polymer. Exudation may already occur in the masterbatch which causes problems during processing of the polymer e.g. in an extruder, where during the extrusion of the silane group containing polymer mixed with the cross-linking composition the catalyst feeder is blocked. Such a blocking may lead to a lowering of catalyst added to the polymer and hence to an uncontrolled deterioration of the properties of the finally produced polymer.

The degradation of the stabilizer may also lead to volatile low molecule substances which evaporate into the air and thus cause a bad smell. In addition, the degradation of the stabilizer deteriorates the ageing properties of the polymer as a lower amount of original stabilizer is present in the polymer.

Furthermore, the stabilizer must not inhibit or lower the activity of the catalyst, or negatively effect other properties of the polymer on contact with the catalyst.

Most common stabilizers for cross-linked polymers include ester group containing compounds such as Irganox 1010, Irganox 1035 and Irganox 1076 of Ciba-Geigy. However, it has been found now that these common stabilizers degrade when mixed with acidic silanol condensation catalysts, e.g. in a master batch, thus leading to exudation. This is the case even if the master batch is kept water free by the addition of water absorbing additives, which inhibits the acid catalysed ester cleavage.

Further, it has been found that the use of stabilizers containing basic groups or metal soaps inhibit the activity of a sulphonic acid silanol condensation catalyst. Stabilizers containing aromatic sulfur groups, i.e. groups wherein a sulfur atom is directly linked to an aromatic group, also degrade in the presence of acidic silanol condensation catalysts leading to bad smell.

It is therefore an object of the present invention to provide a stabilizer for cross-linking compositions containing a sulphonic acid compound as a silanol condensation catalysts, for silane group containing cross-linked polymers which have been cross-linked in the presence of a sulphonic acid catalyst as well as for the cross-linking process of silane group containing polymers in the presence of a sulphonic acid catalyst whereby the stabilizer does not cause exudation problems, does not give rise to bad smell, does not inhibit the activity of the catalyst and yields the desired amelioration of the ageing properties of the polymer, in particular with respect to the thermo-oxidative degradation.

The present invention is based on the finding that such a stabilizer must be neutral or acidic, must comprise a sterically hindered phenol group or aliphatic sulphur groups and must not contain ester groups.

The present invention therefore provides a composition for cross-linking and stabilization of polymers containing hydrolysable silane groups comprising a sulphonic acid as a silonal condensation catalyst which comprises a stabilizer which is neutral or acidic, does not contain ester groups and is a compound according to formula (I):

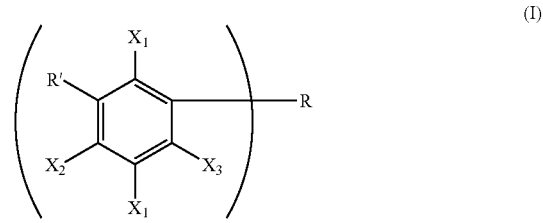

wherein
R is an unsubstituted or substituted aliphatic or aromatic hydrocarbyl radical which may comprise heteroatoms;
R' is a hydrocarbyl radical,
R" is a hydrocarbyl radical,
and R' and/or R" being a bulky radical,
$X_1$, $X_2$ and $X_3$ is the same or different H or OH, whereby at least $X_1$, $X_2$ or $X_3$ is OH,
and n is 1 to 4;

or a compound according to formula (II):

wherein
R''' is an aliphatic hydrocarbyl radical and
p is 1 to 6.

It is preferred that R is unsubstituted. However, if R is substituted it is preferred that it contains only hydroxy radicals as substituents.

Heteroatoms may also be present in R, such as O-atoms forming ether groups, for example, if the stabilizer is produced in an oligomerisation reaction from phenolic compounds, or S-atoms which however may not be directly linked to an aromatic group.

It is further preferred that n in formula (I) is 2 or 3.
Preferably, R' is a bulky hydrocarbyl radical.
Further preferred, $X_1$ in formula (I) is OH.
Preferably, p in formula (II) is 1 or 2.

Furthermore, the present invention provides a stabilized polymer which contains cross-linked silane groups wherein the cross-linking has been performed by use of a sulphonic acid as a silanol condensation catalyst which comprise a stabilizer as specified above for the inventive composition. Further, the invention provides a process for cross-linking and stabilization of silane group containing polymers by the use of a sulphonic acid as a silanol condensation catalyst wherein the process is carried out in the presence of a stabilizer as specified above for the inventive composition.

The inventive composition, polymer or process may as a stabilizer either comprise a single compound as characterized above or a mixture thereof.

In the inventive composition, polymer or process no or only a very low degree of exudation occurs. Thus, problems in the processing caused by the exudation, e.g. during the extrudation of the silane group containing polymer mixed with the cross-linking composition are avoided.

Further, from the inventive composition, polymer or process no volantile substances evaporate into the air and thus no bad smell is caused.

As the stabilizer in the inventive composition does not degrade the desired amelioration of ageing properties of the polymer can be achieved.

In a preferred embodiment the inventive composition comprises a stabilizer which is neutral or acidic, does not contain ester groups and is a compound according to formula (I)
R is an aliphatic hydrocarbyl radical which may comprise hydroxy groups,
$X_1$ is OH, $X_2$ and $X_3$ is H,
R' is a bulky aliphatic hydrocarbyl radical,
R" is an aliphatic hydrocarbyl radical,
n is 2;
or a compound according to formula (II) wherein
R'" is an aliphatic hydrocarbyl radical from $C_{12}$ to $C_{20}$ and p is 1 or 2.
Preferably, R in formula (I) is $CH_2$.
Further preferred, p in formula (II) is 2.

These stabilizers are also preferred in the inventive polymer and process.

In a further preferred embodiment the inventive composition comprises a stabilizer which is selected from the group of 2,2'-methylene-bis(6-(1-methyl-cyclohexyl)para-cresol) (corresponding to the compound of formula (I) wherein R is $CH_2$, R' is 1-methyl-cyclohexyl, R" is $CH_3$, $X_1$ is OH, $X_2$ and $X_3$ is H and n is 2), 2,2'-methylene-bis(4-methyl-6-tert.-butylphenol) (corresponds to the compound of formula (I) wherein R is $CH_2$, R' is tert.-butyl, R" is $CH_3$, $X_1$ is OH, $X_2$ and $X_3$ is H and n is 2), and di-octadecyl-disulphide (corresponding to the compound of formula (II) wherein R'" is octadecyl and p is 2).

This stabilizer is also further preferred in the inventive polymer and process.

In a particularly preferred embodiment the inventive composition comprises 2-2'-methylene-bis(6-(1 methyl-cyclohexyl)para-cresol) as a stabilizer. It is also particularly preferred that the inventive polymer as well as the inventive process comprise this stabilizer.

This particular preferred stabilizer may also be advantageously used in a mixture with 2,2'-methylene-bis(4-methyl-6-tert.-butylphenol).

The inventive composition is preferably added to the cross-linkable polymer in the form of a master batch, i.e. the additives such as the catalyst and the stabilizer are mixed with a polymer such as a homo- or copolymer of ethylene, e.g. low density polyethylene or polyethylene-methyl-ethyl-butyl-acrylate copolymer containing 1 to 50 percent by weight of the acrylate and mixtures thereof. Further constituents of the master batch may be for example a drying agent and a scorch retardant.

The master match contains a minor amount of the stabilizer, generally about 0.01 to 4 wt %, preferably about 0.02 to 2 wt %.

In the final polymer, the stabilizer in general is present in an amount of at most 2 wt %, preferably from 0.1 to 0.5 wt % and most preferred from 0.15 to 0.3 wt %.

It is preferred that the silanol condensation catalyst is a sulphonic acid compound according to formula (III)

$$ArSO_3H \qquad (III)$$

or a precursor thereof, Ar being a hydrocarbyl substituted aryl group and the total compound containing 14 to 28 carbon atoms.

Preferably, the Ar group is a hydrocarbyl substituted benzene or naphthalene ring, the hydrocarbyl radical or radicals containing 8 to 20 carbon atoms in the benzene case and 4 to 18 atoms in the naphthalene case.

It is further preferred that the hydrocarbyl radical is an alkyl substituent having 10 to 18 carbon atoms and still more preferred that the alkyl substituent contains 12 carbon atoms and is selected from dodecyl and tetrapropyl. Due to commercial availability it is most preferred that the aryl group is a benzene substituted group with an alkyl substituent containing 12 carbon atoms.

The currently most preferred compounds of formula (III) are dodecyl benzene sulphonic acid and tetrapropyl benzene sulphonic acid.

The silanol condensation catalyst may also be precursor of a compound of formula (III), i.e. a compound that is converted by hydrolysis to a compound of formula (III). Such a precursor is for example the acid anhydride of the sulphonic acid compound of formula (III). Another example is a sulphonic acid of formula (III) that has been provided with a hydrolysable protective group as e.g. an acetyl group which can be removed by hydrolysis to give the sulphonic acid of formula (III).

The preferred amount of silanol condensation catalyst with respect to the cross-linkable polymer composition is from 0.0001 to 3 wt %, more preferably 0.001 to 2 weight % and most preferably 0.005 to 1 weight % based on the amount of silanol groups containing polymers in the composition.

The effective amount of catalyst depends on the molecular weight of the catalyst used. Thus, a smaller amount is required of a catalyst having a low molecular weight than a catalyst having a high molecular weight.

If the catalyst is contained in a master batch it is preferred that it comprises the catalyst in an amount of 0.02 to 5 wt %, more preferably about 0.05 to 2 wt %.

The present invention generally concerns cross-linkable polymers containing hydrolysable silane groups. More preferably the cross-linkable polymer is a polyolefin and still more preferably is a polyethylene.

The hydrolysable silane groups may be introduced into the polymer by copolymerization of e.g. ethylene monomers with silane group containing comonomers or by grafting, i.e. by chemical modification of the polymer by addition of silane groups mostly in a radical reaction. Both techniques are well known in the art.

Preferably, the silane group containing polymer has been obtained by copolymerization. In the case of polyolefins, preferably polyethylene, the copolymerization is preferably carried out with an unsaturated silane compound represented by the formula $$R^1SiR^2_qY_{3-q} \tag{IV}$$

wherein
$R^1$ is an ethylenically unsaturated hydrocarbyl, hydrocarbyloxy or (meth)acryloxy hydrocarbyl group,
$R^2$ is an aliphatic saturated hydrocarbyl group,
Y which may be the same or different, is a hydrolysable organic group and
q is 0, 1 or 2.

Special examples of the unsaturated silane compound are those wherein R' is vinyl, allyl, isopropenyl, butenyl, cyclohexanyl or gamma(meth)-acryloxy propyl; Y is methoxy, ethoxy, formyloxy, acetoxy, propionyloxy or an alkyl-or arylamino group; and $R^2$, if present, is a methyl, ethyl, propyl, decyl or phenyl group.

A preferred unsaturated silane compound is represented by the formula $$CH_2=CHSi(OA)_3 \tag{V}$$

wherein A is a hydrocarbyl group having 1-8 carbon atoms, preferably 1-4 carbon atoms.

The most preferred compounds are vinyl trimethoxysilane, vinyl bismethoxyethoxysilane, vinyl triethoxysilane, gamma-(meth)acryloxypropyltrimethoxysilane, gamma (meth)acryloxypropyltriethoxysilane, and vinyl triacetoxysilane.

The copolymerization of the olefin, e.g. ethylene, and the unsaturated silane compound may be carried out under any suitable conditions resulting in the copolymerization of the two monomers.

Moreover, the copolymerization may be implemented in the presence of one or more other comonomers which can be copolymerized with the two monomers. Such comonomers include (a) vinyl carboxylate esters, such as vinyl acetate and vinyl pivalate, (b) alpha-olefins, such as propene, 1-butene, 1-hexane, 1-octene and 4-methyl-1-pentene, (c) (meth)acrylates, such as methyl(meth)acrylate, ethyl(meth)acrylate and butyl(meth)acrylate, (d) olefinically unsaturated carboxylic acids, such as (meth)acrylic acid, maleic acid and fumaric acid, (e) (meth)acrylic acid derivativs, such as (meth)acrylonitrile and (meth)acrylic amide, (f) vinyl ethers, such as vinyl methyl ether and vinyl phenyl ether, and (g) aromatic vinyl compounds, such as styrene and alpha-ethyl styrene.

Amongst these comonomers, vinyl esters of monocarboxylic acids having 1-4 carbon atoms, such as vinyl acetate, and (meth)acrylate of alcohols having 1-4 carbon atoms, such as methyl(meth)-acrylate, are preferred.

Especially preferred comonomers are butyl acrylate, ethyl acrylate and methyl acrylate.

Two or more such olefinically unsaturated compounds may be used in combination. The term "(meth)acrylic acid" is intended to embrace both acrylic acid and methacrylic acid. The comonomer content of the copolymer may amount to 70% by weight of the copolymer, preferably about 0.5 to 35% by weight, most preferably about 1 to 30% by weight.

If using a graft polymer, this may have been produced e.g. by any of the two methods described in U.S. Pat. Nos. 3,646, 155 and 4,117,195, respectively.

The silane-containing polymer according to the invention suitably contains 0.001-15% by weight of the silane compound, preferably 0.01-5% by weight, most preferably 0.1-2% by weight.

The inventive polymer composition may further contain varies additives, such as miscible thermoplastics, further stabilizers, lubricants, fillers, coloring agents and foaming agents.

The following examples are incorporated herein to further illustrate the present invention:

EXAMPLES

1. For illustrating the effect of the inventive stabilising compositions, masterbatches containing stabilisers with sulphonic acid (dodecyl benzene sulphonic acid) silanol condensation catalyst (formulation 2) and without catalyst (formulation 1) were prepared in a 250 ml Brabender batch-mixer at 160° C. in fifteen minutes and pelletised according to Table 1:

TABLE 1

|  | Formulation 1 | Formulation 2 | Formulation 3 |
|---|---|---|---|
| EBA copolymer with 17% BA | 98% | 96.3% | 96.3% |
| Stabiliser | 2% | 2% | 2% |
| Sulphonic acid |  | 1.7% |  |
| Dibutyl tin dilaurate (DBTDL) |  |  | 1.7% |

As stabilisers, the compounds 4,4'-thiobis(2-tert.butyl-5-methylphenol) (Lowinox TBM6P), 2,2'-thiodiethylenebis-(3,5-di-tert.butyl-4-hydroxyphenyl)-propionate (Irganox 1035), octadecyl-3-(3',5'-di-tert.-butyl-4-hydroxyphenyl) propionate (Irganox 1076), di-lauryl-thio-di-propionate (Irganox PS 802) and tris(2-tert.-butyl-4-thio(2'-methyl-4'-hydroxy-5'-tert.-butyl)phenyl-5-methyl)phenylphosphite (Hostanox OSP1) as comparative examples, and 1,3,5-trimethyl-2,4,6-tris-(3,5-di-tert.butyl-4-hydroxyphenyl)benzene (Irganox 1330), di-octadecyl-disulphide (Hostanox SE10), butylated reaction product of p-cresol and dicyclopentadiene according to formula VI (Lowinox CPL)

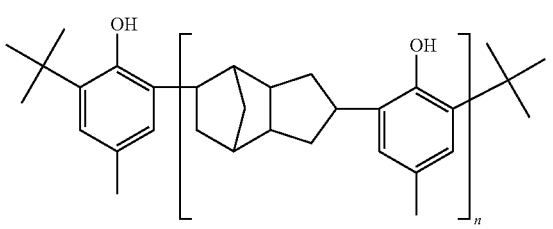

and 2,2'-methylene-bis(6-(1-methyl-cyclohexyl)para-cresol) (Lowinox WSP) according to the invention were used.

2. For testing of the stability of the stabilizers in acidic environment, HPLC extraction tests were performed according to the following procedure:

Pellet samples were prepared according to 1. and were stored for seven days at 23° C. or twenty-one days at 55° C.

and seven days at 23° C. in heat sealed hermetic closed Al-foiled polyethylene bags. Before and after this treatment, 20 gram of pellets sample and 50-ml isopropyl alcohol were added to a glass beaker. The mixtures were blended with a magnetic mixer for five minutes. Thereby, the isopropyl alcohol extracted the stabiliser from the pellet surface. 2 ml of the liquid phase was filtered into a Vials.

10 ul sample taken from the Vials was injected into a HPLC colon (HPLC type: Waters Aliace 2690, Colon type: Zorbax SB C8, 4,6 mm×125 mm, Mobile phases: 1. Isopropyle alcohol with 0.5 mmolar alkyltrimethylamoniumbromide, 2. de-ionised water.) in which the different stabilisers could be separated and detected in a UV-detector (225 nm).

The results from these tests are shown in Table 2. The reference e.g. origin concentration before the ageing treatment received by the HPLC has been kept to 100%. The table is describing the % remaining stabiliser in the formulations related to the origin level. The data in the table therefore represent a direct measurement of the degradation behaviour of the stabilizer.

TABLE 2

|  | Formulation 2 | Formulation 3 |
| --- | --- | --- |
| After 1 week in 23° C. | | |
| Irganox 1035 (Comp.) | 80% | >99% |
| Lowinox TBM 6P (Comp.) | 95% | >99% |
| Irganox 1330 | >99% | >99% |
| Lowinox WSP | >99% | >99% |
| After three weeks in 55° C. and 1 week in 23° C. | | |
| Irganox 1035 (Comp.) | <5% | >99% |
| Lowinox TBM 6P (Comp.) | 75% | >99% |
| Irganox 1330 | >99% | >99% |
| Lowinox WSP | >99% | >99% |

The results from these tests show a decrease in stabiliser concentration, i.e. degradation, already at lower temperatures in the sulphonic acid containing formulation 2 for the comparative compositions comprising Irganox 1035 and Lowinox TBM6P. In contrast, the compositions comprising the stabilisers according to the invention did not show degradation and hence no decrease in stabiliser concentration even if stored for longer time at elevated temperature.

3. Five weight percent of the pellets of the formulations in Table 1 were dry mixed with 95 weight percent of pellets of LDPE-silane copolymer (VTMS content=1.9 wt. %, $MFR_{2=1}$ g/10 min). The pellet mixtures were extruded in a lab extruder over a 1.5 $mm^2$ solid copper conductor to form an insulated cable with 0.7 mm thick plastic insulation layer.

100 g of the cables together with 5 g water was collected in Al-foiled polyethylene bags. The bags were heat-sealed to form a hermetic closed wrapping.

The cables were stored and crosslinked in this package for one week at 23° C.

4. A smell test was performed on the crosslinked samples prepared according to 1. and 3. in which a test panel of three independent persons opened the bags and smelled at the samples. The results of this test are shown in Table 3.

TABLE 3

|  | 5% formulation 1 + 95% silane copolymer | 5% formulation 2 + 95% silane copolymer | 5% formulation 3 + 95% silane copolymer |
| --- | --- | --- | --- |
| Lowinox TBM6P (Comp.) | no smell | strong mercaptanic smell | no smell |
| Irganox 1330 | no smell | no smell | no smell |
| Lowinox WSP | no smell | no smell | no smell |
| Hostanox SE10 | no smell | no smell | no smell |

The results from this test show that sulphur containing stabilisers with the sulphur directly linked to a phenol (benzene) ring (Lowinox TBM6P) degrades in sulphonic acid environment and thus causes strong mercapanic smell.

All stabilisers used in the composition and polymer according to the invention did not cause mercaptanic or other smell in the presence of sulphonic acid catalyst.

5. For testing the thermo-oxidative degradation behaviour, stabilizer masterbatches were prepared according to the procedure described under 1. (formulation 2) but with the amount of stabilizers as indicated in Table 4. Then, the masterbatches in the amount as indicated in Table 4 were mixed with the silane-copolymer, extruded and cross-linked according to 3. The samples were thermo-oxidatively aged in 150° C. in cell oven (Elastocon, 15 air changes/h) which are specially designed for ageing.

Every day, aged samples were tested for cracks formation of the insulation according to the mandrel test describes in IEC 60811-1-2.

The results of these tests are shown in Table 4.

TABLE 4

|  | day of occurrence of cracks in polymer composition |
| --- | --- |
| Irganox 1035 (FF) (Comp.) [1] | 2 |
| Lowinox CLP [1] | 5 |
| Irganox 1330 (FF) [1] | 5 |
| Irganox PS 802 (Comp.) [2] | 3 |
| Hostanox SE10 [2] | 6 |
| Irganox 1076 (Comp.) [3] | 1 |
| Lowinox WSP [3] | 4 |

[1] The masterbatch contained the same stoichiometric amount of phenol groups (6.8 mmol per 100 g) of the stabilizers as indicated, 2 wt. % of Hostanox OSP1 and 3 wt. % of Irganox PS 802. 5 wt. % of the masterbatch was added to the silane copolymer.
[2] The masterbatch contained the same stoichiometric amount of sulfur groups (4.4 mmol per 100 g) of the stabilizers as indicated, 2 wt. % of Hostanox OSP1 and 1.75 wt. % of Irganox 1330. 5 wt. % of the masterbatch was added to the silane copolymer.
[3] The masterbatch contained the same stoichiometric amount of phenolic groups (0.023 mol per 100 g) of the stabilizers as indicated. 5 wt. % of the masterbatch was added to the silane copolymer.

These test show that the stabilising compositions according to the invention comprising Irganox 1330, Hostanox SE 10 and Lowinox WSP are more effective in improving the ageing properties of the polymer compared to the comparative compositions.

Having thus described the invention, we hereby claim as follows:

1. A composition comprising a sulphonic acid and a stabilizer, the stabilizer having the structure of formula (II):

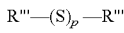 (II)

wherein
R''' is an aliphatic hydrocarbyl radical and
p is 1 to 6; and
wherein the sulphonic acid has the structure of formula (III):

 (III)

wherein Ar is a hydrocarbyl substituted aryl group and the total compound of formula (III) contains at least 14 carbon atoms.

2. The composition according to claim 1 wherein R''' is an aliphatic hydrocarbyl radical from $C_{12}$ to $C_{20}$ and p is 1 or 2.

3. The composition according to claim 2, wherein R''' is octadecyl, and p is 2.

4. The composition of claim 1, wherein the sulphonic acid contains from 14 to 28 carbon atoms.

5. A composition comprising a sulphonic acid, a first stabilizer, and a second stabilizer, the first stabilizer having the structure of formula (II):

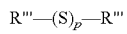
(II)

wherein
R''' is an aliphatic hydrocarbyl radical and
p is 1 to 6, and
wherein the second stabilizer is neutral or acidic, does not contain ester groups, and has the structure of formula (I):

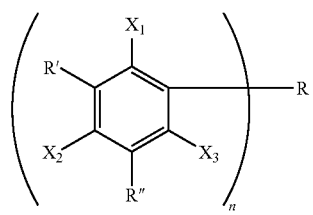
(I)

wherein
R is an unsubstituted or substituted aliphatic or aromatic hydrocarbyl radical which may comprise heteroatoms,
R' is a hydrocarbyl radical,
R'' is a hydrocarbyl radical,
$X_1$, $X_2$ and $X_3$ are independently H or OH, wherein at least one of $X_1$, $X_2$ and $X_3$ is OH,
and n is 1 to 4.

6. The composition according to claim 5 wherein
R is an aliphatic hydrocarbyl radical which may comprise hydroxy groups,
$X_1$ is OH, $X_2$ and $X_3$ is H,
R' is a bulky aliphatic hydrocarbyl radical,
R'' is an aliphatic hydrocarbyl radical, and
n is 2.

7. The composition according to claim 6, wherein
R' is 1-methylcyclohexyl or tert-butyl; and
R'' is $CH_3$.

8. The composition according to claim 7, wherein R is $CH_2$.

9. A stabilized polymer comprising cross-linked silane groups, a sulphonic acid, and a stabilizer having the structure of formula (II):

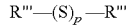
(II)

wherein
R''' is an aliphatic hydrocarbyl radical and
p is 1 to 6.

10. The polymer according to claim 9 wherein
R''' is an aliphatic hydrocarbyl radical from $C_{12}$ to $C_{20}$ and p is 1 or 2.

11. The polymer according to claim 10, wherein
R''' is octadecyl
and p is 2.

12. The polymer according to claim 9, further comprising a second stabilizer, wherein the second stabilizer is neutral or acidic, does not contain ester groups, and has the structure of formula (I):

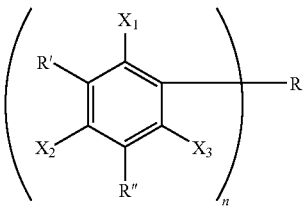
(I)

wherein
R is an unsubstituted or substituted aliphatic or aromatic hydrocarbyl radical which may comprise heteroatoms,
R' is a hydrocarbyl radical,
R'' is a hydrocarbyl radical,
$X_1$, $X_2$ and $X_3$ are independently H or OH, wherein at least one of $X_1$, $X_2$ and $X_3$ is OH,
and n is 1 to 4.

13. The polymer according to claim 12 wherein
R is an aliphatic hydrocarbyl radical which may comprise hydroxy groups,
$X_1$ is OH, $X_2$ and $X_3$ is H,
R' is a bulky aliphatic hydrocarbyl radical,
R'' is an aliphatic hydrocarbyl radical, and
n is 2.

14. The polymer according to claim 13 wherein
R' is 1-methylcyclohexyl or tert-butyl; and
R'' is $CH_3$.

15. The polymer according to claim 14 wherein R is $CH_2$.

16. The polymer of claim 9, wherein the sulphonic acid has the structure of formula (III):

$ArSO_3H$ (III)

wherein Ar is a hydrocarbyl substituted aryl group and the total compound of formula (III) contains at least 14 carbon atoms.

17. The polymer of claim 16, wherein the sulphonic acid contains from 14 to 28 carbon atoms.

18. The polymer of claim 9, wherein the cross-linked silane groups are formed by the crosslinking of a polyolefin containing hydrolysable silane groups.

19. The polymer of claim 18, wherein the polyolefin is polyethylene.

* * * * *